United States Patent

[11] 3,615,321

| [72] | Inventors | Willis L. Carruth<br>Glendale;<br>Robert W. Negus, Arcadia, both of Calif. |
|---|---|---|
| [21] | Appl. No. | 721,473 |
| [22] | Filed | Apr. 15, 1968 |
| [45] | Patented | Oct. 26, 1971 |
| [73] | Assignee | Cary Instruments<br>Monrovia, Calif. |

[54] METHOD OF FORMING A POTASSIUM ION SENSITIVE GLASS ELECTRODE
2 Claims, 5 Drawing Figs.

[52] U.S. Cl. ............................................................ 65/30, 204/1, 204/195.1
[51] Int. Cl. ............................................................ C03c 21/00
[50] Field of Search ............................................ 65/30, DIG. 6, 136; 204/1, 195.1

[56] References Cited
UNITED STATES PATENTS

| 2,829,090 | 4/1958 | Eisenman et al. | 204/1 |
| 3,041,252 | 6/1962 | Eisenman et al. | 204/1 |
| 3,278,399 | 10/1966 | Budd | 204/1 |
| 3,459,641 | 8/1969 | Hebert | 204/1 |

Primary Examiner—S. Leon Bashore
Assistant Examiner—John H. Harman
Attorney—White & Haefliger ABSTRACT: The method of making a glass electrode more sensitive to $K^+$ than to $Na^+$ in electrolytic solution includes the steps of forming a glass melt to have an initial composition of $K_2O$, $Al_2O_3$ and $SiO_2$ where the mol percents of $K_2O$ and $Al_2O_3$ are chosen to optimize sensitivity ratio ($K^+$ sensitivity to $Na^+$ sensitivity) with low electrode output drift; digesting the melt for an extended period to substantially reduce the electrode output drift rate; and forming the electrode from the digest melt.

INVENTORS.
WILLIS L. CARRUTH
ROBERT W. NEGUS
By White & Haefliger
ATTORNEYS.

INVENTORS.
WILLIS L. CARRUTH
ROBERT W. NEGUS

By White & Haefliger

ATTORNEYS.

METHOD OF FORMING A POTASSIUM ION SENSITIVE GLASS ELECTRODE

BACKGROUND OF THE INVENTION

This invention relates generally to glass electrodes useful in measuring potassium ion activity. More particularly, the invention concerns an improved glass electrode characterized by low output signal drift rate, chemical stability in electrolyte test solutions, and high ratio of $K^+$ sensitivity to $N^+$ sensitivity.

From the very beginning of work with pH glass electrodes, the effect of sodium and potassium ions was noted and it was generally found that if these ions were present in significant concentrations large errors in the pH value were observed. A number of authors reported investigations of the errors produced by these ions and gave some quantitative data concerning the magnitude of the error. However, it was not until the work that was reported by Lengyel and Blum in Transactions of the Faraday Society, Vol. 30, pp. 461-471 (1934), that the glass electrodes were used to measure the concentrations of one of these ions. Lengyel and Blum studied the compositions of a number of glasses which were found to be sensitive to sodium ion concentration and some of these electrodes were used to determine the actual concentrations of sodium in solution. Their paper gave the relationship of the composition of the glass used in forming the electrode to the response to the sodium ion concentration and to the response to the pH of the solution.

A very extensive study of the composition of pH responsive glasses was made by George A. Perley and reported in Analytical Chemistry, Vol. 21, of the year 1949. In this series of papers, reports were made on the composition of glasses which were found to be pH responsive and the effect of sodium ion was also indicated.

In 1958, U.S. Pat. No. 2,829,090 was issued to George Eisenman describing glass electrodes for measuring sodium ion and a means of using a glass electrode of a composition indicated in the patent for measuring the potassium ion concentration. The glass electrode proposed for the measurement of potassium ion concentration was found to be very sensitive to sodium ion concentration and this made it difficult to make direct measurement of the potassium ion concentration. The ratio of response for the electrode to potassium over sodium was characteristically about three to one. Nicolsky et al. (Journal of Physical Chemistry of the U.S.S.R., Volume 32, pp. 262-269, 1958) and later Eisenman (U.S. Pat. No. 3,041,252) reported parallel work on the composition of glasses proposed for use in potassium-sensitive glass electrodes, in the Nicolsky work).

While the work described by Nicolsky and Eisenman is useful, substantial problems still remain. For example, it has been found that glass made of some of the compositions proposed in the later Eisenman patent is extremely unstable with respect to water and electrolyte solutions. Some of the glass is so hygroscopic that water was picked up from the atmosphere and the glass rapidly became too soft to maintain its physical form and shape. Further, during attempts to measure potassium ion concentration using such a glass electrode, the high solubility of the glass caused such a rapid drift in output signal EMF that meaningful measurements could not be made. Also, drift rate, fragility and selectivity problems were encountered in use of the Eisenman electrodes. Further, the compositions disclosed by Nicolsky have been found to have certain deficiencies in performance relative to compositions disclosed hereinbelow, as will be appreciated from the following discussion.

SUMMARY OF THE INVENTION

It is a major object of the invention to provide solutions to the difficulties described above through the provision of improved glass electrodes and methods of making same. As will be seen, the output EMF drift rate of the electrode in electrolytic solution may be significantly reduced by forming the electrode from a melt initially comprising about 19 mol percent of $K_2O$, 20, a mol percentage of $Al_2O_3$ less than the mol percentage of $K_2O$ and the balance of the melt comprising $SiO_2$.

In accordance with another aspect of the invention, the EMF drift rate (for an electrode formed from a melt of a composition as will be described) may be maintained below 25 microvolts per minute by digesting the melt at elevated temperature, as for example in excess of 1,500° C., and for a period of time in excess of 50 hours, prior to forming the electrode. Also, EMF drift characteristics may be improved by extended aging of the glass electrode in contact with an aqueous electrolytic solution.

A further aspect of the invention concerns substantial improvements in the stability characteristics of glass electrodes, through incorporation in the melt of less than 1.0 mol percent $Fe_2O_3$. As will be seen, if more than 1.0 mol percent $Fe_2O_3$ is used, the selectivity ratio ($K^+/Na^+$) diminishes to an undesirable extent.

These and other objects and advantages of the invention, as well as the details of illustrative embodiments, will be more fully understood from the following description of the drawings, in which:

DESCRIPTION OF PREFERRED EMBODIMENTS

Figure 5:
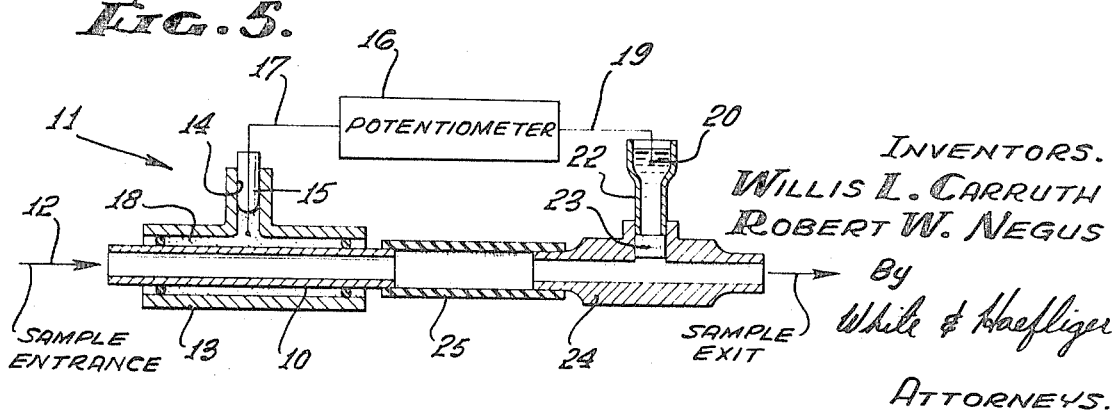
FIG. 5 is a vertical elevation of one form of apparatus in which the electrode of the invention may be used.

Referring first to FIG. 5, a glass electrode 10 is shown included in apparatus 11 operable to measure potassium ion concentration in flowing liquid (or static specimen), as for example whole blood introduced to the tubular electrode at 12. Surrounding the electrode is a tubular body 13 containing electrolyte 18, as for example an aqueous solution containing 0.140 normal NaCl and 0.004 normal KCl, adjusted to pH 7.4 with 2 amino-2-hydroxy-methyl-1,3-propan-diol plus HCl. Projecting into the electrode via a side opening 14 in the tubing 13 is a nonpolarizable reference electrode 15 (silver-silver chloride) to which potentiometer 16 is connected via lead 17. A second lead 19 extends to a calomel reference electrode 20 in electrolyte 21 (which may be saturated KCl) contained within tubular riser 22. A porus plug 23 separates the electrolyte from the liquid sample in tubing 24 and duct 25 connecting tube 10 with tubing 24. The high impedance, high gain potentiometer may be calibrated with known solutions containing mixtures of $H^+$, $Na^+$ and $K^+$ cations, and the $K^+$ ion of the sample can thus be determined. Potentiometer 16 must include a null-sensing element of particularly high input impedance, such as for example, a vibrating reed electrometer.

Figure 1:
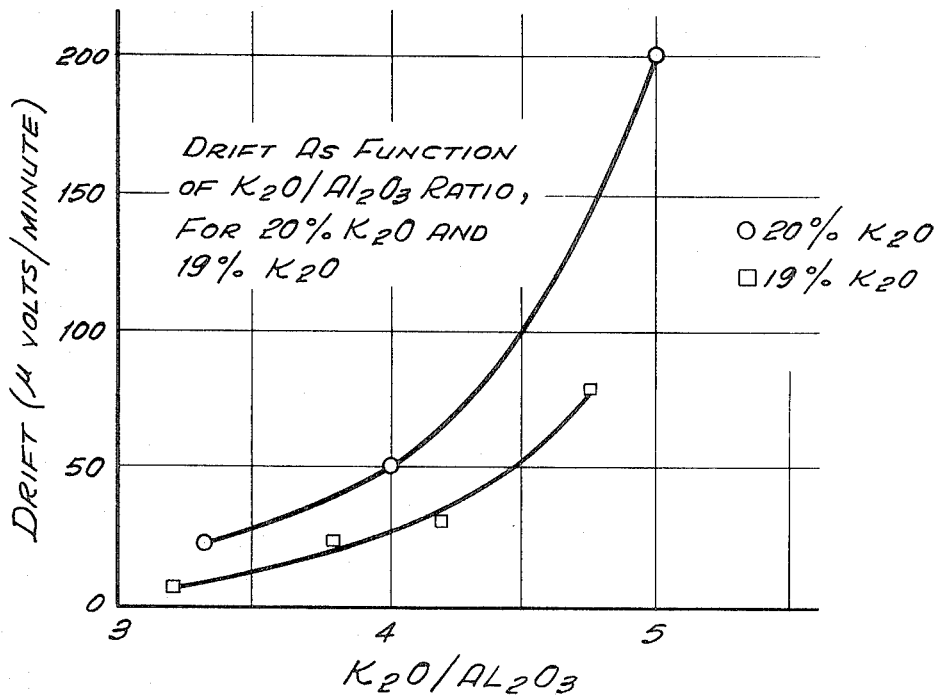
FIG. 1 is a plot of drift vs. $K_2O/Al_2O_3$ ratio.
Figure 2:
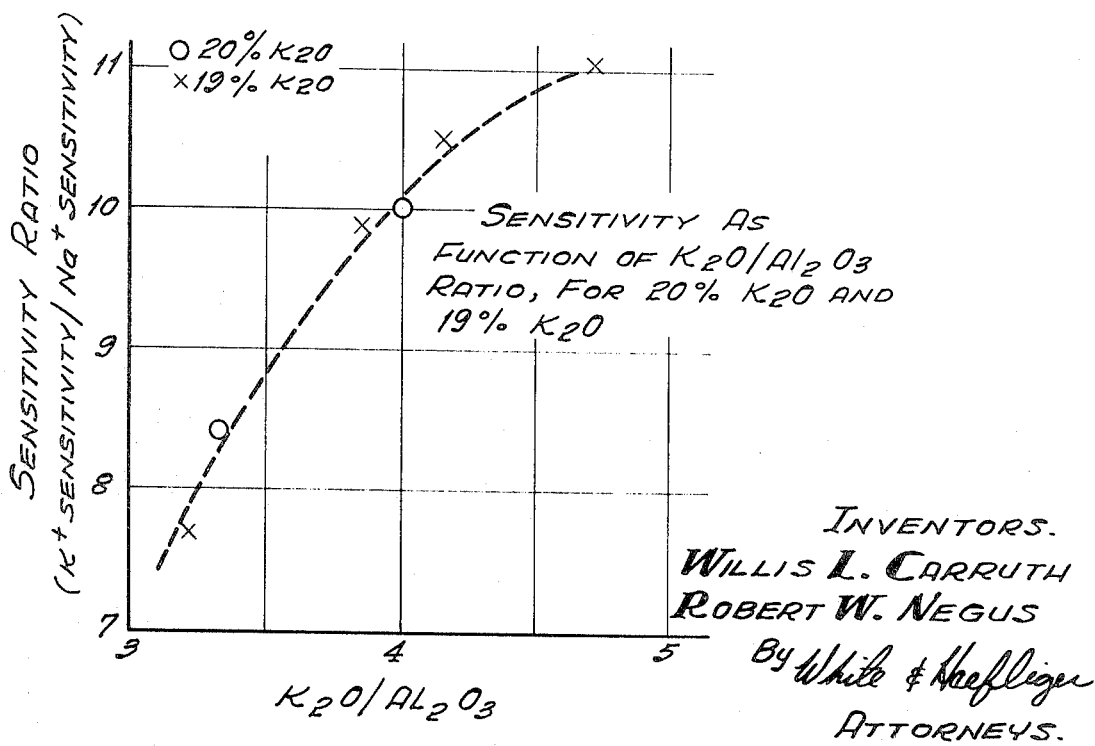
FIG. 2 is a plot of sensitivity ratio vs. $K_2O/Al_2O_3$ ratio.

A large number of glass electrode melts were tested in an attempt to determine which were best suited to the measurement of potassium ion concentration. The electrodes were formed from glass melts consisting of a major mol percentage of silica and minor mol percentage of potassium oxide and aluminum oxide wherein the mol percentage of potassium oxide substantially exceeded the mol percentage of aluminum oxide. FIGS. 1 and 2 illustrate the results of tests showing the change in electrode output drift and sensitivity ratio ($K^+$ sensitivity to $Na^+$ sensitivity) as functions of the ratio $K_2O/Al_2O_3$ in various melts. Further, one series of melts contained 20 percent $K_2O$, and another series of melts, contained 19 percent $K_2O$, the corresponding drift curves being illustrated in FIG. 1. It is clear that much lower drift resulted for the 19 percent $K_2O$ melts, for each $K_2O/Al_2O_3$ ratio, a drift of about $25\mu$ volts/minute or less being necessary for most applications. It was further found that if the mol percentage of $K_2O$ was reduced to 18, the electrode glass developed exceedingly high electrical resistance and moreover tended to devitrify at the ambient temperatures of normal use, rendering the composition completely useless for practical purposes. Accordingly, a mol percentage of $K_2O$ of about 19, i.e. within the range 18.5 to 19.5 was found to be the optimum.

Reference to FIG. 2 shows that the sensitivity ratio ($K^+$ sensitivity to $Na^+$ sensitivity) increases as the ratio $K_2O/Al_2O_3$ increases; however, FIG. 1 illustrates that as the latter ratio increases the drift increases. It was found that an optimum electrode of high sensitivity (over 10) and acceptably low drift (about $25\mu$ volts/min. or less) was formed from a melt wherein the $K_2O/Al_2O_3$ ratio was about 4.2, an example being 19 mol percent $K_2O$ and 4.5 mol percent $Al_2O_3$. In this regard, the melts of FIGS. 1 and 2 contained substantially only $SiO_2$ in addition to the $K_2O$ and $Al_2O_3$ fractions.

Figure 3:
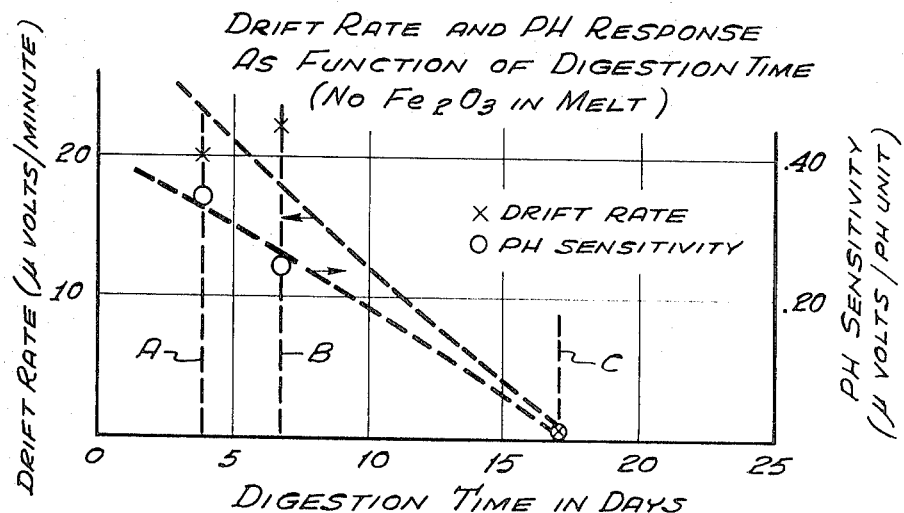
FIG. 3 is a plot of drift rate and pH response vs. digestion time.

It was also found that the EMF drift rate and pH response of the potassium ion sensitive glasses under investigation decreased as a function of melt digestion time, as is clearly illustrated in FIG. 3.

In that Figure, the melt was retained at 1,300° C. for 4 days to provide electrode samples from which the points indicated on vertical line A were obtained; then the melt temperature was increased to 1,500° C. and retained there for 3 more days to provide electrode samples from which the points indicated on vertical line B were obtained; and finally, the melt was held at 1,500° C. for 10 additional days to obtain the final points seen at C.

It was also found that the sensitivity ratio ($K^+$ sensitivity to $Na^+$ sensitivity) decreased with extended heating of the glass melt. For example, electrodes fabricated from a melt after 4 days of heating at 1,500° C. had a sensitivity ratio of 10; whereas after 8 days of heating at 1,500° C. the ratio had dropped to 7.5. It was found that a digestion time of over 2 days (to assure reduction of the drift rate below 25 $\mu$ volts/min.) and of less than about 6 days (to maintain sensitivity ratio above about 10) for digestion temperatures of around 1,500° C. is desirable. The drift rate and pH response decreased more rapidly at such higher digestion temperatures. For example, drift rate and pH response were essentially zero for a specimen of melt (similar to the melts of FIG. 3) after 70 hours heating at 1,480° C. and 4 additional hours at 1,540° C.

The melts under consideration in respect of digestion time evaluations had $K_2O/Al_2O_3$ ratios of about 4.2. Finally, specimens heated for 22 days at 1,500° C. were found to be extremely fragile, to have high electrical resistivity and to have very low sensitivity to potassium ion activity.

Figure 4:
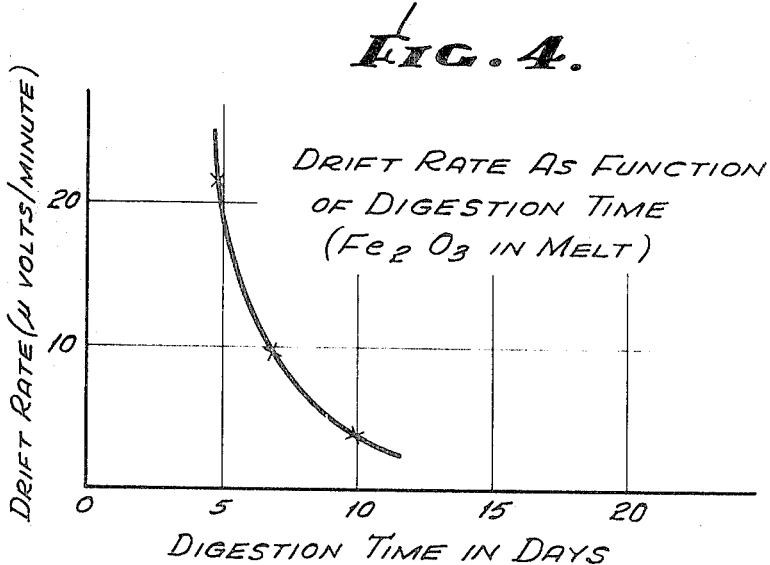
FIG. 4 is a plot of drift rate vs. digestion time.

Tests were also made with respect to glasses containing iron oxide, namely glass melts comprising $K_2O$, $Al_2O_3$, $SiO_2$ and $Fe_2O_3$, in which the percentage of $Fe_2O_3$ in the prefusion mix was 3 mol percent, 1 mol percent, 0.5 mol percent and 0.2 mol percent. The chemical stability (resistance to attack by solutions) of these glasses was good; however, the selectivity (of glass for potassium over sodium) for the glass containing 3 mol percent and 1 mol percent $Fe_2O_3$ was lower than for glasses of the same composition excepting that the $Fe_2O_3$ was replaced by $SiO_2$ in the glass. On the other hand, the selectivity ratios for glasses with 0.5 mol percent and 0.2 mol percent $Fe_2O_3$ were approximately the same as for the same glasses without $Fe_2O_3$. Electrodes made from glasses which contained 0.5 mol percent $Fe_2O_3$ were chemically stable in electrolytic test solutions and were found to have fast response to change in potassium ion activity. Response rates of glasses containing over 0.2 mol percent $Fe_2O_3$ were better than for glasses containing less than 0.2 mol percent $Fe_2O_3$. FIG. 4 shows the effect on drift rate of high temperature (1,500° c.) digestion of a melt containing about 0.5 mol percent $Fe_2O_3$.

Finally, it was found that aging the glass electrodes at ambient temperatures in electrolytic solutions closely similar to those in which measurements were to be made (as for example undiluted blood plasma) resulted in improvement in stability, that is, lower EMF drift. Electrodes aged in this manner for over 45 days were distinctly superior to those which were used for measurement purposes soon after fabrication.

It will be clear to one skilled in the art that the potassium-ion concentration measurements made with electrodes and systems such as are described herein will require correction for effect of sodium ion on the potassium electrode; or, if this effect is neglected, the measurements will contain systematic error.

Techniques for making such correction are described in many places in the literature, including textbooks and technical articles known to those skilled in the art. For example, the above-referenced Eisenman patents describe in considerable detail procedures for initial calibration of electrode systems and calculation therefrom of final ion activity.

We claim:

1. In the method of making a glass electrode more sensitive to $K^+$ than to $Na^+$ in electrolytic solution, the steps that include
   a. forming a glass melt to consist of an initial composition of about 19 mol percent $K_2O$, about 4.5 mol percent $Al_2O_3$, from 0.2 to about 0.5 mol percent $Fe_2O_3$ and the balance $SiO_2$ only,
   b. digesting the melt by maintenance at elevated temperature around 1,500° C. for a digestion period over 2 days and less than about 6 days,
   c. and forming the electrode from said melt.

2. The method of claim 1 including maintaining the electrode in surface contact with an aqueous electrolytic solution containing $K^+$ and $Na^+$ for an aging period in excess of 2 weeks.

* * * * *